(12) United States Patent
Feng

(10) Patent No.: US 12,115,035 B2
(45) Date of Patent: Oct. 15, 2024

(54) DISPOSABLE CLEANING BOX FOR INVISIBLE BRACES

(71) Applicant: Yukun Feng, Dalian (CN)

(72) Inventor: Yukun Feng, Dalian (CN)

(73) Assignee: Dalian Haluo Zhuoai E-commerce Co., Ltd., Dalian (CN)

( * ) Notice: Subject to any disclaimer, the term of this patent is extended or adjusted under 35 U.S.C. 154(b) by 0 days.

(21) Appl. No.: 18/591,049

(22) Filed: Feb. 29, 2024

(65) Prior Publication Data

US 2024/0197455 A1 Jun. 20, 2024

(51) Int. Cl.
- *A61C 19/00* (2006.01)
- *B65D 77/20* (2006.01)
- *B65D 77/30* (2006.01)
- *A61C 7/08* (2006.01)

(52) U.S. Cl.
CPC .......... *A61C 19/00* (2013.01); *B65D 77/2024* (2013.01); *B65D 77/30* (2013.01); *A61C 7/08* (2013.01)

(58) Field of Classification Search
CPC ........ A61B 17/06; A61B 19/02; B65D 83/10; B65D 77/20; B65D 77/2024; B65D 77/30
USPC .................................................. 206/63.5, 83
See application file for complete search history.

(56) References Cited

U.S. PATENT DOCUMENTS

| | | | |
|---|---|---|---|
| 6,715,603 B1 * | 4/2004 | Uribe ..................... | A61C 15/00 206/63.5 |
| 7,090,073 B2 * | 8/2006 | Barnes .................... | A61C 19/10 206/63.5 |
| 7,137,812 B2 * | 11/2006 | Cleary ................... | A61C 7/146 206/63.5 |
| 7,841,464 B2 * | 11/2010 | Cinader, Jr. ............ | A61C 7/16 206/63.5 |
| 8,657,108 B2 * | 2/2014 | Nihei ..................... | A61C 19/02 206/63.5 |
| 9,662,192 B2 * | 5/2017 | Chastain ................ | A61C 19/02 |
| 2005/0239019 A1 * | 10/2005 | Hall ....................... | A61C 17/02 433/167 |
| 2014/0120040 A1 * | 5/2014 | Moulton ................ | A61C 15/00 424/48 |

* cited by examiner

*Primary Examiner* — Bryon P Gehman

(57) ABSTRACT

The present disclosure relates to the technical field of braces cleaning, and specifically discloses a disposable cleaning box for invisible braces. The disposable cleaning box for invisible braces includes a box body and a cover film. The box body is configured to place the braces. The box body is filled with a cleaning fluid. An adhesive plate is connected around an outer edge of an opening of the box body. The cover film covers the opening of the box body. The cover film is connected to a top surface of the adhesive plate. The present disclosure has an effect of improving the convenience for cleaning the braces.

14 Claims, 6 Drawing Sheets

DISPOSABLE CLEANING BOX FOR INVISIBLE BRACES

TECHNICAL FIELD

The present disclosure relates to the technical field of braces cleaning, and in particular, to a disposable cleaning box for invisible braces.

BACKGROUND OF THE INVENTION

Invisible braces are a series of almost imperceptible transparent braces customized using a 3D computer technology. They are worn on the periphery of teeth to achieve the purpose of correcting teeth.

In the related technology, in a process of wearing the invisible braces, as people need to eat food via the oral cavity, some stains or residues are inevitably left on the braces. Therefore, the braces need to be cleaned regularly. Common cleaning methods include removing the braces, throwing the braces into a cleaning vessel filled with warm water, then adding effervescent tablets, and soaking the braces for 15 min to 30 min to achieve the purpose of cleaning.

In the above-mentioned related technology, the special cleaning vessel, the warm water, and the effervescent tablets are required for cleaning the braces, and the braces need to be cleaned at any time after the wearer eats food to ensure the cleanliness and beautiful appearance of the braces. Therefore, the wearer has to carry the cleaning vessel, the effervescent tablets, and even the warm water around. The wearer needs to open the cleaning container, inject the warm water into the cleaning vessel, add the effervescent tablets, and then clean the braces. Afterwards, the wearer cleans the cleaning container and puts it away. The wearer needs to carry the cleaning vessel and the effervescent tablets around, making the cleaning of the braces more complicated.

SUMMARY OF THE INVENTION

In order to improve the convenience of cleaning of braces, the present disclosure provides a disposable cleaning box for invisible braces.

The disposable cleaning box for the invisible braces according to the present disclosure adopts the following technical solutions:

A disposable cleaning box for invisible braces includes a box body and a cover film, wherein the box body is configured to place the braces; the box body is filled with a cleaning fluid; an adhesive plate is connected around an outer edge of an opening of the box body; the cover film covers the opening of the box body; and the cover film is connected to a top surface of the adhesive plate.

Optionally, the box body is in a V shape with a radian; the shape of the box body is similar to a shape of the braces; and the cover film is also similar to the shape of the braces.

Optionally, an outer side edge of the cover film is connected to a tear off film.

Optionally, an outer side edge of the adhesive plate is connected to a convex plate; the tear off film is aligned with the convex plate; and the tear off film is not adhered to the convex plate.

Optionally, the convex plate is located at one end of the box body and between two ends of the box body.

Optionally, the cover film is connected to the adhesive plate and a heat seal.

Optionally, an opening in a top of the box body is larger than an opening in a bottom of the box body.

Optionally, a bottom surface of the box body is an arc surface.

Optionally, an inner side edge of a corner of the cover film is connected with a reinforcing film.

Optionally, a connecting plate is connected between two parts of the adhesive plate on an inner side of the corner of the box body; a side surface of the connecting plate that is not connected to the adhesive plate is a plane; and the reinforcing film is aligned with the connecting plate.

Optionally, a handheld plate is arranged between the two ends of the box body, and the handheld plate is connected between two parts of the adhesive plate.

Optionally, a shielding film is connected to a side edge of the cover film; the shielding film is aligned with the handheld plate; and the convex plate is located at one end of the box body and on one side away from the handheld plate.

In summary, the present disclosure include at least one of the following beneficial effects:

When the braces need to be cleaned, the cover film is torn off from the top surface of the adhesive plate; the braces is then placed in the box body; and the cleaning fluid in the box body is used to soak and clean the braces. After the cleaning is finished, the box body can be directly discarded. A wearer can carry a desired quantity of disposable box bodies according to a traveling need. These box bodies are disposable, so that the wearer does not need to consider carrying a cleaning vessel, effervescent tablets, and even warm water. Thus, the convenience for the wearer to cleaning the braces can be improved.

Since the reinforcing film is connected to the inner side of the corner of the cover film, which is equivalent to performing passivating treatment. The reinforcing film shares a force that originally acts on the inner side of the corner of the cover film, so that the cover film is not easily broken from the corner of the cover film in the tearing process.

To tear the cover film, a user uncovers the tear off film with one hand. The cover film is pulled first through the tear off film. The user reaches a space between the shielding film and the handheld plate with the thumb of the other hand, grips the handheld plate tightly with the index finger and the thumb, and continues to pull the cover film until the cover film is torn off from the box body. It is not necessary to worry about pushing the cleaning fluid out of the box body because of overexertion.

DETAILED DESCRIPTION OF THE INVENTION

The present disclosure will be further explained below in detail in conjunction with FIG. 1 to FIG. 6.

Embodiment 1

Figure 1:
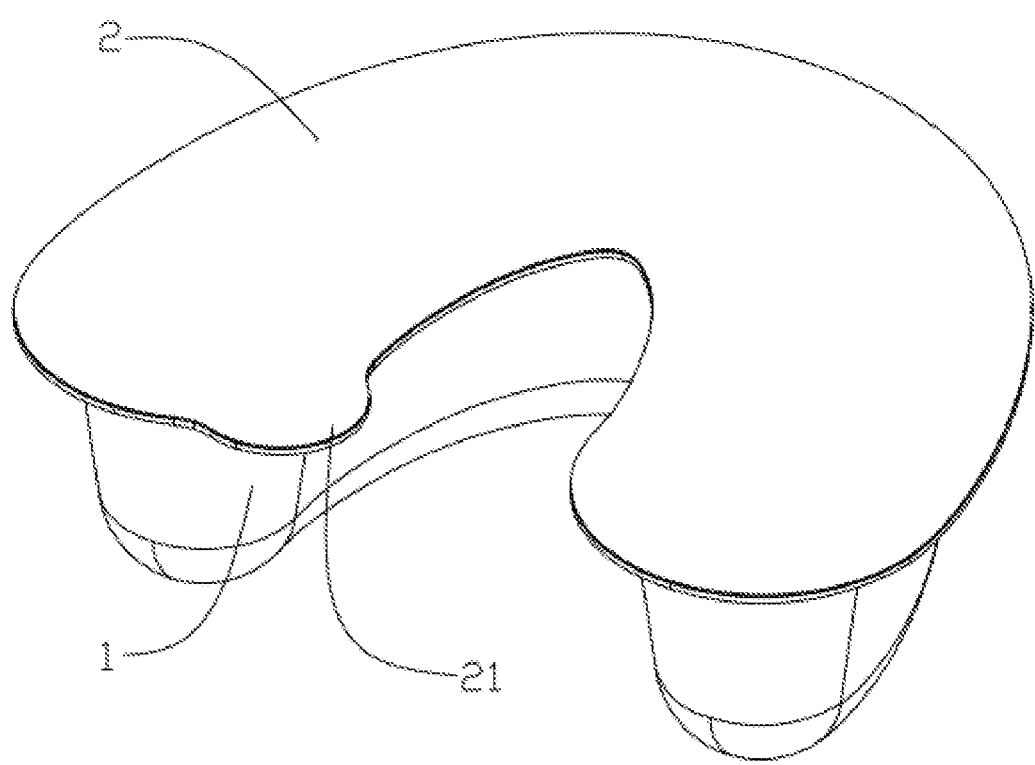
FIG. 1 is a schematic structural diagram of a disposable cleaning box according to Embodiment 1 of the present disclosure.
Figure 2:
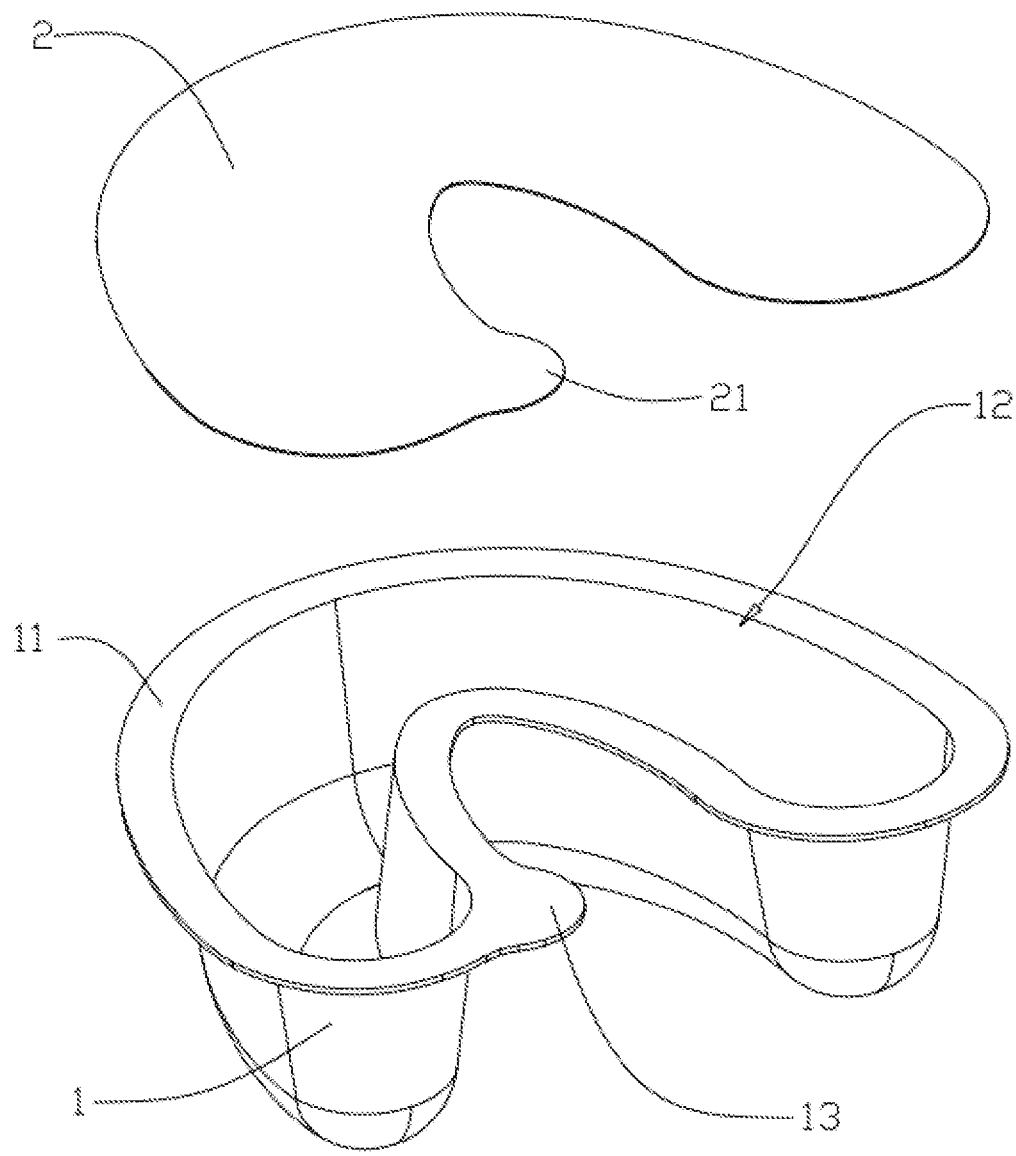
FIG. 2 is a schematic diagram of an exploded structure of a disposable cleaning box according to Embodiment 1 of the present disclosure.
Figure 3:
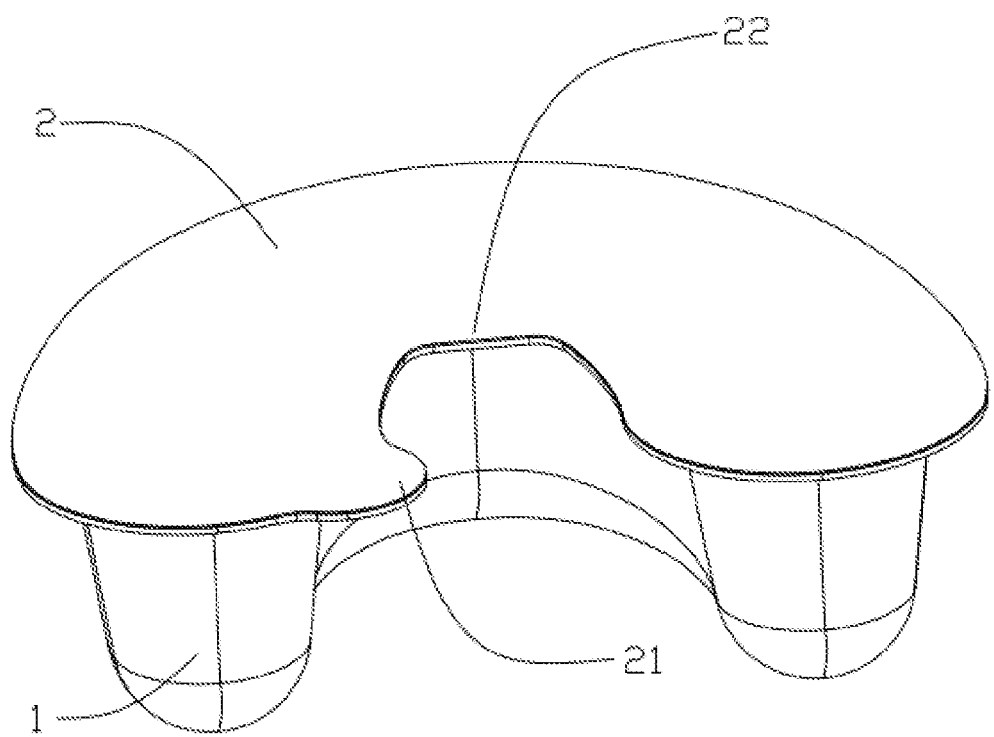
FIG. 3 is a schematic structural diagram of a disposable cleaning box according to Embodiment 2 of the present disclosure.
Figure 4:
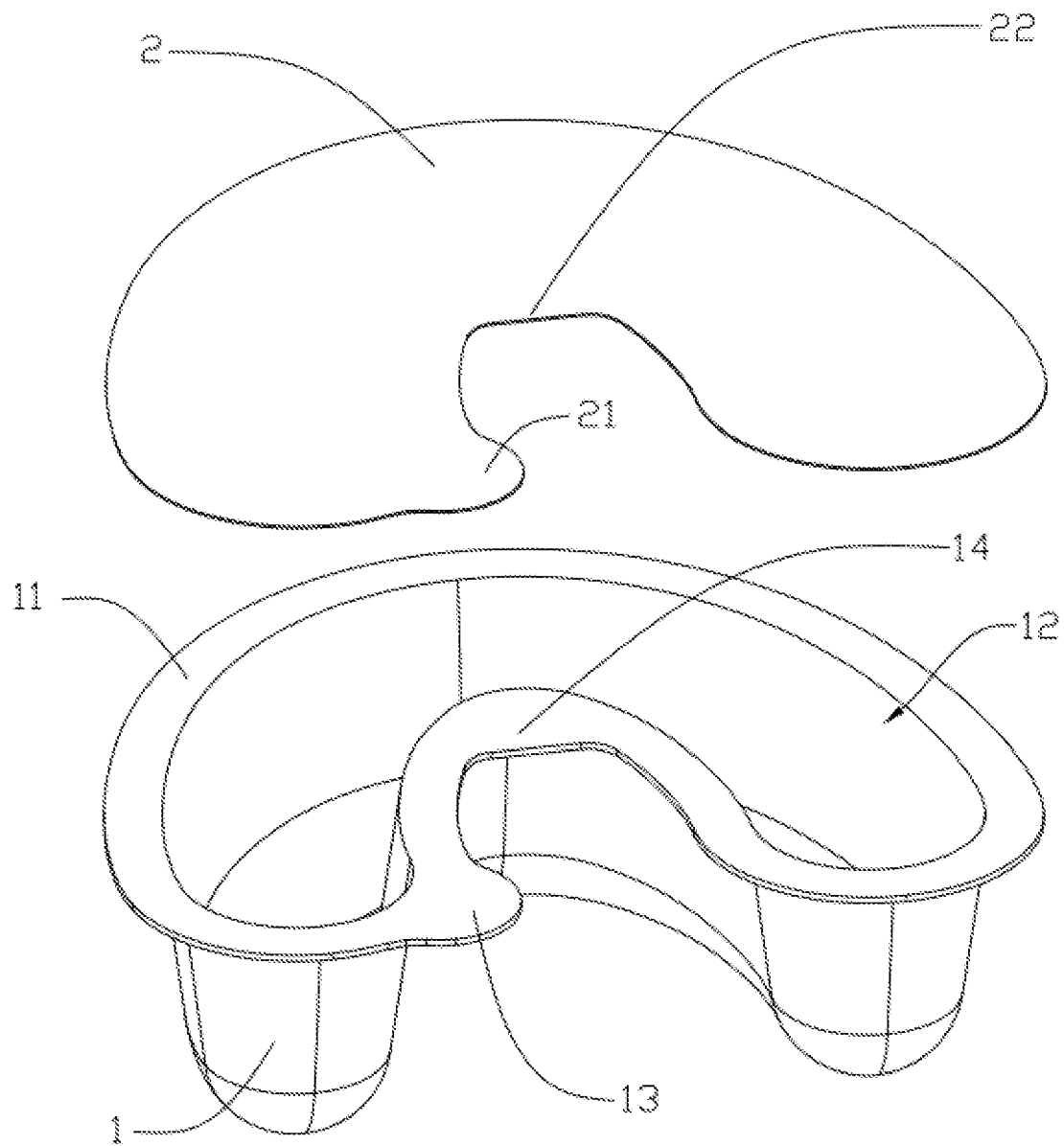
FIG. 4 is a schematic diagram of an exploded structure of a disposable cleaning box according to Embodiment 2 of the present disclosure.
Figure 5:
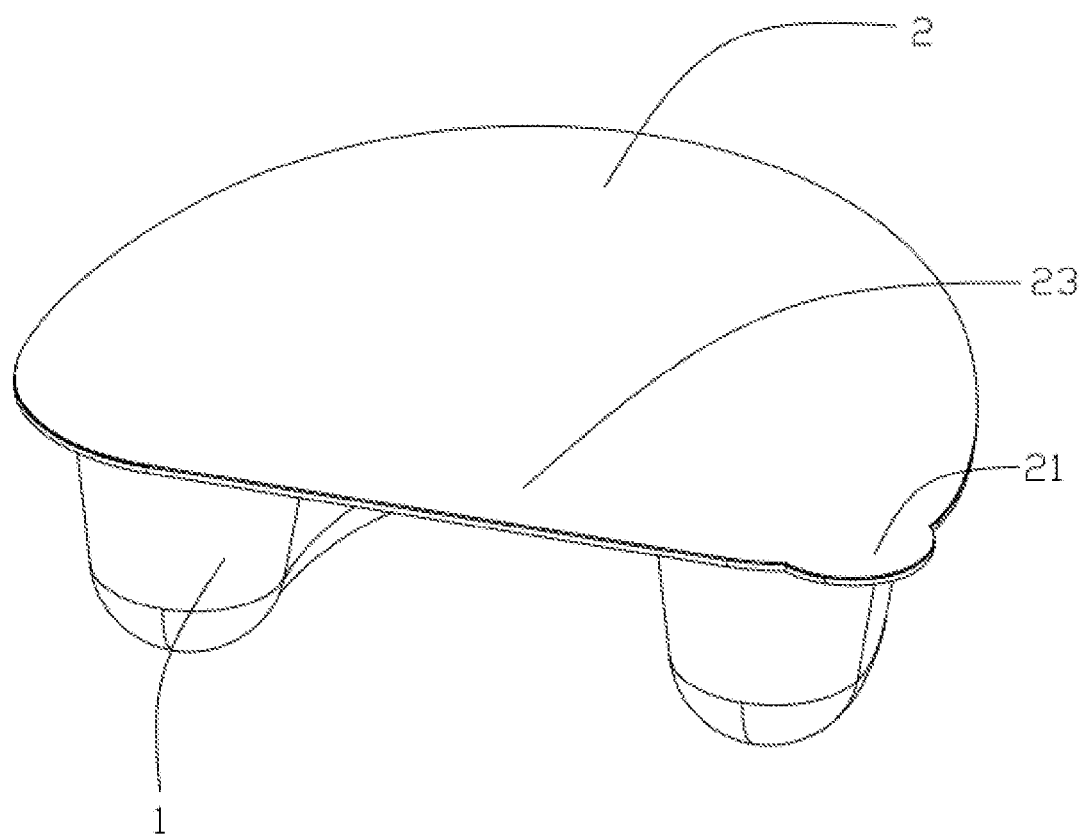
FIG. 5 is a schematic structural diagram of a disposable cleaning box according to Embodiment 3 of the present disclosure.
Figure 6:
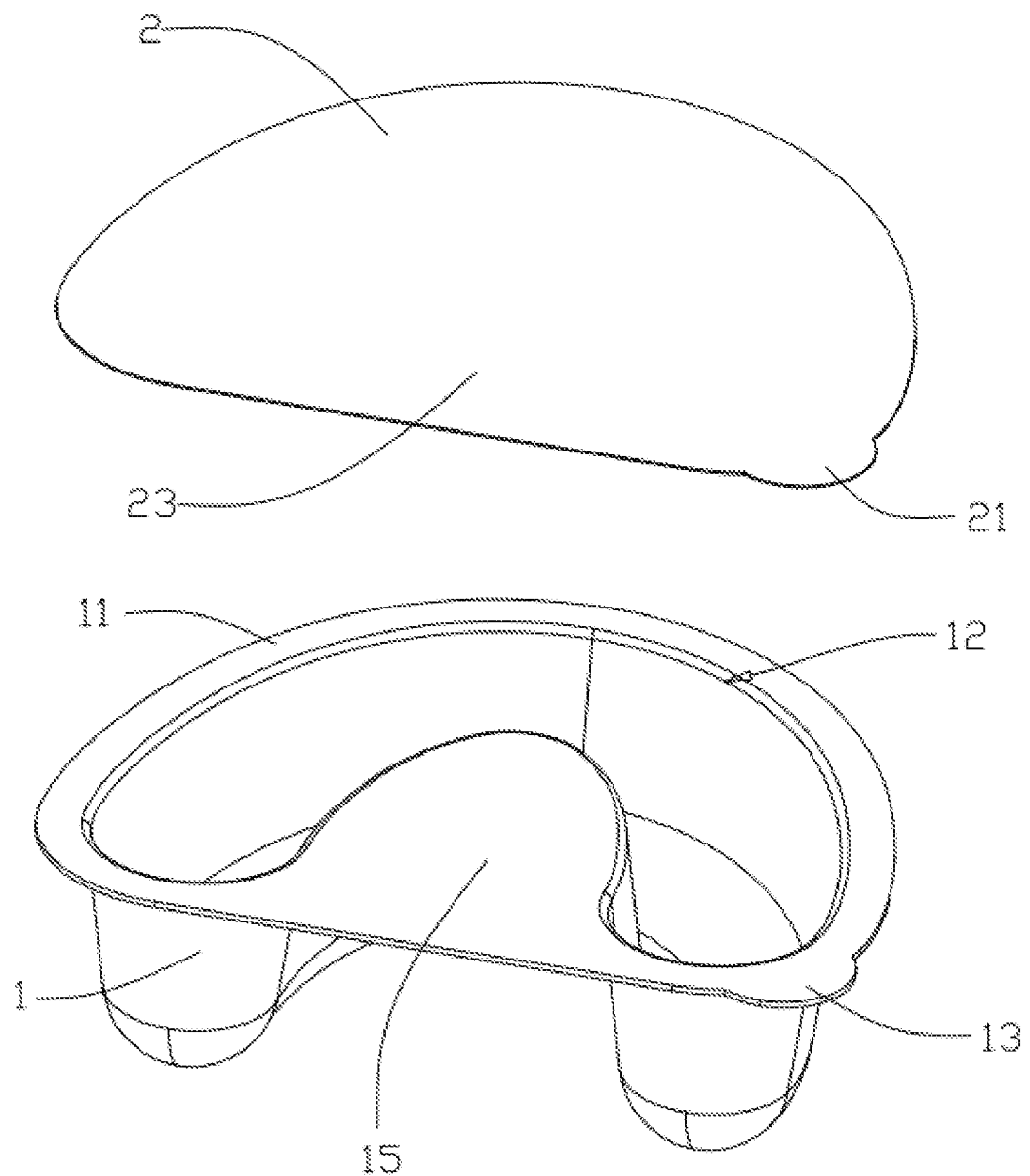
FIG. 6 is a schematic diagram of an exploded structure of a disposable cleaning box according to Embodiment 3 of the present disclosure.

This embodiment of the present disclosure discloses a disposable cleaning box for invisible braces. Referring to FIG. 1 to FIG. 2, a disposable cleaning box for invisible braces includes a box body 1 and a cover film 2, wherein the box body 1 is configured to place the braces; the box body 1 is a transparent plastic material; the box body 1 is filled with a cleaning fluid; an adhesive plate 11 is integrally formed around an outer edge of an opening 12 of the box body 1; the cover film 2 covers the opening 12 of the box body 1; and the cover film 2 is heat-sealed to a top surface of the adhesive plate 11.

When the braces need to be cleaned, the cover film 2 is torn off from the top surface of the adhesive plate 11; the braces is then placed in the box body 1; and the cleaning fluid in the box body 1 is used to soak and clean the braces. After the cleaning is finished, the box body 1 can be directly discarded. A wearer can carry a desired quantity of disposable box bodies 1 according to a traveling need. These box bodies are disposable, so that the wearer does not need to consider carrying a cleaning vessel, effervescent tablets, and even warm water. Thus, the convenience for the wearer to cleaning the braces can be improved.

The box body 1 is in a V shape with a radian; the shape of the box body 1 is similar to a shape of the braces; and the cover film 2 is also similar to the shape of the braces. Therefore, the box body 1 with the smallest size and the smallest amount of cleaning fluid are required to complete the cleaning of the braces. To produce the box body 1, a few of materials are used, which saves more energy and reduces much emission.

An outer side edge of the adhesive plate 11 is integrally formed with a convex plate 13. An outer side edge of the cover film 2 is integrally formed with a tear off film 21. The tear off film 21 is aligned with the convex plate 13, and the tear off film 21 is not adhered to the convex plate 13. In order to tear the cover film 2 off from the opening 12 of the box body 1 more easily, the tear off film 21 is arranged. When the tear off film 21 is pulled, the cover film 2 can be torn off from the opening 12 of the box body 1.

The convex plate 13 is located at one end of the box body 1 and at a position between two ends of the box body 1, so that the overall box body 1 is smoother. The convex plate 13 is located on an inner side of the box body 1, so that it is not easily scraped and collided with another object.

The opening 12 in a top of the box body 1 is larger than that in a bottom of the box body 1. A bottom surface of the box body 1 is an arc-shaped surface. Since a part of the braces close to the gingiva has a larger size, and a part of the braces away from the gingiva has a smaller size. When the braces is placed in the box body 1, the part of the braces away from the gingiva is first placed into the box body 1, and the entire braces is placed, so that the box body 1 is more in line with the design of the braces. The box body 1 is designed more reasonably, which further reduces the materials of the box body 1 and the amount of the cleaning fluid in the box body.

An implementation principle of the disposable cleaning box for the invisible braces according to this embodiment of the present disclosure is as follows: When the braces need to be cleaned, the tear off film 21 is uncovered, and the tear off film 21 pulls the cover film 2 off from the top surface of the adhesive plate 11; the braces is then placed in the box body 1; and the cleaning fluid in the box body 1 is used to soak and clean the braces. After the cleaning is finished, the box body 1 can be directly discarded. A wearer can carry a desired quantity of disposable box bodies 1 according to a traveling need. These box bodies are disposable, so that the wearer does not need to consider carrying a cleaning vessel, effervescent tablets, and even warm water. Thus, the convenience for the wearer to cleaning the braces can be improved.

Embodiment 2

In the process of tearing the cover film 2 through the tear off film 21, since an angle of an inner side of a corner of the cover film 2 is small, it is easy to crack the inner side of the corner of the cover film 2 because of an improper tearing angle, and the cover film 2 may be broken. The cover film 2 needs to be torn again from the breakage, causing inconvenience of tearing the cover film 2.

This embodiment of the present disclosure discloses a disposable cleaning box for invisible braces. A different from Embodiment 1 is that referring to FIG. 3 to FIG. 4, a connecting plate 14 is integrally formed between two parts of the adhesive plate 11 on an inner side of a corner off the box body 1. A side surface of the connecting plate 14 that is not integrally formed with the adhesive plate 11 is a plane; an outer side edge of the cover film 2 is connected with a reinforcing film 22; and the reinforcing film 22 is aligned with the connecting plate 14.

An implementation principle of the disposable cleaning box for the invisible braces according to this embodiment of the present disclosure is as follows: Since the reinforcing film 22 is connected to the inner side of the corner of the cover film 2, which is equivalent to performing passivating treatment. The reinforcing film 22 shares a force that originally acts on the inner side of the corner of the cover film 2, so that the cover film 2 is not easily broken from the corner of the cover film 2 in the tearing process.

Embodiment 3

In the process of tearing the cover film 2, the two hands are required. The cover film 2 is torn with one hand, and the box body 1 is gripped tightly with the other hand. Since the box body 1 is made of a soft material, so that it is easy to push the cleaning fluid out of the box body 1 by overexertion in the tearing process.

This embodiment of the present disclosure discloses a disposable cleaning box for invisible braces. A difference from Embodiment 1 is that referring to FIG. 5 to FIG. 6, a handheld plate 15 is arranged between the two ends of the box body 1, and the handheld plate 15 is connected between two parts of the adhesive plate 11. A shielding film 23 is connected to a side edge of the cover film 2; the shielding film 23 is aligned with the handheld plate 15; and the convex plate 13 is located at one end of the box body 1 and on one side away from the handheld plate 15.

An implementation principle of the disposable cleaning box for the invisible braces according to this embodiment of the present disclosure is as follows: To tear the cover film 2, a user uncovers the tear off film 21 with one hand. The cover film 2 is pulled first through the tear off film 21. The user reaches a space between the shielding film 23 and the handheld plate 15 with the thumb of the other hand, grips the handheld plate 15 tightly with the index finger and the thumb, and continues to pull the cover film 2 until the cover film 2 is torn off from the box body 1. It is not necessary to worry about pushing the cleaning fluid out of the box body 1 because of overexertion.

The above embodiments are only preferred embodiments of the present disclosure, and do not limit the protection scope of the present disclosure. Therefore, any equivalent changes made on the basis of the structure, shape, and principle of the present disclosure shall all fall within the protection scope of the present disclosure.

The invention claimed is:

1. A disposable cleaning box for invisible braces, comprising a box body and a cover film, wherein the box body is configured to place the braces; the box body is filled with a cleaning fluid for disposable cleaning; an adhesive plate is connected around an outer edge of an opening of the box body; the cover film covers the opening of the box body; the cover film is connected to a top surface of the adhesive plate to seal the cleaning fluid in the box body, and the cover film is configured to be disposably torn off from the adhesive plate, such that the braces are able to be disposably soaked and cleaned by the cleaning fluid.

2. The disposable cleaning box for the invisible braces according to claim 1, wherein the box body is in a V shape with a radian; the shape of the box body is similar to a shape of the braces; and the cover film is also similar to the shape of the braces.

3. The disposable cleaning box for the invisible braces according to claim 2, wherein an outer side edge of the cover film is connected to a tear off film.

4. The disposable cleaning box for the invisible braces according to claim 3, wherein an outer side edge of the adhesive plate is connected to a convex plate; the tear off film is aligned with the convex plate; and the tear off film is not adhered to the convex plate.

5. The disposable cleaning box for the invisible braces according to claim 4, wherein the box body comprises two ends corresponding to two ends of the braces, an arc-shaped inner side edge connected between the two ends of the box body, and an arc-shaped outer side edge opposite to the inner side edge and connected between the two ends of the box body, the convex plate is located at one end of the two ends of the box body and adjacent to the arc-shaped inner side edge.

6. The disposable cleaning box for the invisible braces according to claim 5, wherein an inner side edge of a corner of the cover film corresponding to the arc-shaped inner side edge is connected with a reinforcing film.

7. The disposable cleaning box for the invisible braces according to claim 6, wherein a connecting plate is connected between two parts of the adhesive plate on an inner side of a corner of the box body; a side surface of the connecting plate that is not connected to the adhesive plate is a plane; and the reinforcing film is aligned with the connecting plate.

8. The disposable cleaning box for the invisible braces according to claim 5, wherein a handheld plate is arranged between the two ends of the box body, and the handheld plate is connected between two parts of the adhesive plate.

9. The disposable cleaning box for the invisible braces according to claim 8, wherein a shielding film is connected to a side edge of the cover film; the shielding film is aligned with the handheld plate; and the convex plate is located at one end of the box body and on one side away from the handheld plate.

10. The disposable cleaning box for the invisible braces according to claim 6, wherein an inner side of a corner of the adhesive plate is arc-shaped, and the inner side edge of the corner of the cover film is arc-shaped.

11. The disposable cleaning box for the invisible braces according to claim 1, wherein the cover film is connected to the adhesive plate and a heat seal.

12. The disposable cleaning box for the invisible braces according to claim 1, wherein an opening in a top of the box body is larger than an opening in a bottom of the box body.

13. The disposable cleaning box for the invisible braces according to claim 12, wherein a bottom surface of the box body is an arc surface.

14. The disposable cleaning box for the invisible braces according to claim 1, wherein an outer contour of the cover film is the same as an outer contour of the adhesive plate, and the outer contour of the cover film is aligned with the outer contour of the adhesive plate.

* * * * *